Fig. 3.

Patented Nov. 17, 1953

2,659,551

UNITED STATES PATENT OFFICE 2,659,551

CONTROL SYSTEM FOR TANDEM ROTOR HELICOPTERS

Harris S. Campbell, Bryn Athyn, Pa., assignor to Autogiro Company of America, Philadelphia, Pa., a corporation of Delaware Application July 30, 1946, Serial No. 687,115

15 Claims. (Cl. 244—17.23)

1

This invention relates to rotative winged aircraft and is particularly concerned with such aircraft equipped with a plurality of rotors. More specifically, the invention is especially adapted to that type of multiple rotor aircraft in which two rotors are provided and arranged in tandem, i. e., one in advance of the other.

One of the principal objects of the invention is the provision of a tandem rotor arrangement in which the rotors are so arranged as to minimize interference with the action of the rear rotor by the slipstream from the forward rotor, especially during translational flight; and further so as to enable shortening of the body or fuselage of the aircraft, as compared with various prior forms of tandem rotor aircraft.

Another and important object of the invention resides in the provision of a new and improved control system for multiple rotor aircraft, the control system being particularly adaptable for use where the aircraft incorporates two rotors arranged in tandem as above mentioned.

The invention contemplates a novel landing gear arrangement, incorporating a retractible principal landing wheel or the like located in a particularly advantageous relationship to certain other primary units of the aircraft, notably the power plant and the sustaining rotors themselves.

How the foregoing objects and advantages are attained, together with others which will occur to those skilled in the art will be clear from the following description making reference to the accompanying drawings in which—

Most features of the invention are applicable to a wide variety of types of rotative winged aircraft, i. e., to aircraft having either hub driven or jet driven sustaining rotors, such as helicopters, to aircraft in which the rotors are normally autorotationally or aerodynamically actuated, and to convertible or intermediate types. Many features of the invention, however, are of especial adaptability to the type of helicopter in which the rotors are hub driven at least during normal translational flight, and in view of this the drawings illustrate the invention as applied to this type.

Figure 1:
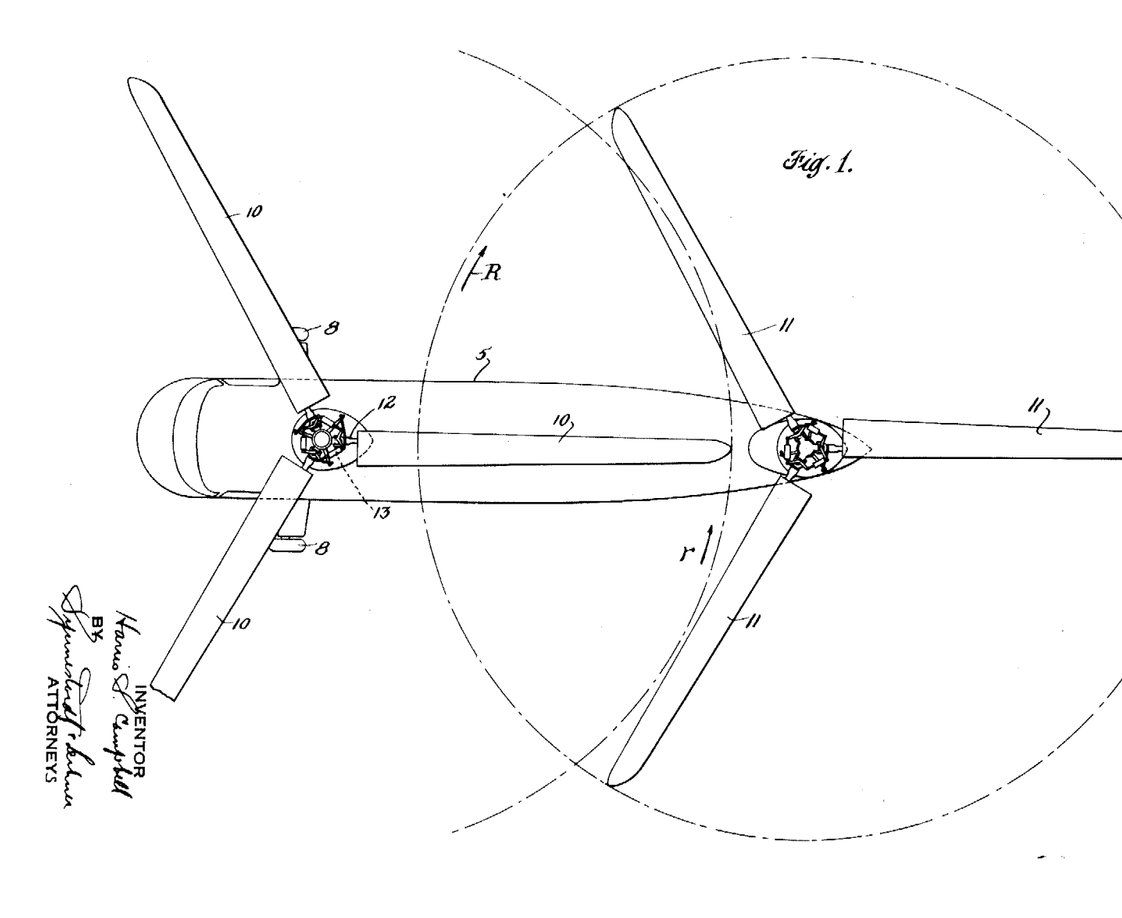
Figure 1 is an outline plan view of an aircraft constructed according to the present invention.
Figure 2:
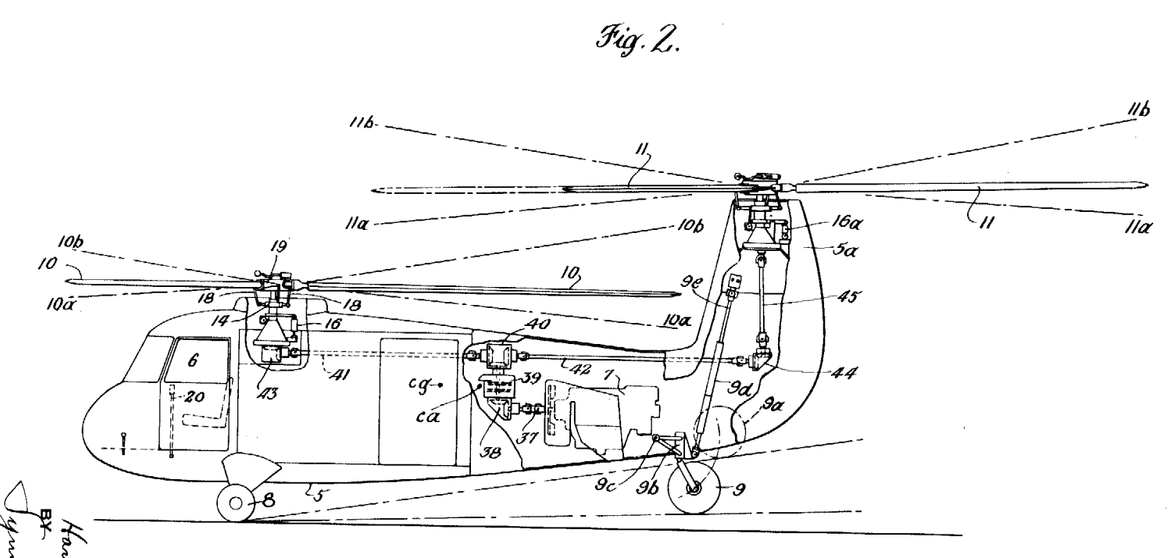
Figure 2 is an outline elevational view, with certain portions of the fuselage broken out to illustrate parts mounted interiorly.

Referring first to Figures 1 and 2, the body or fuselage of the aircraft is designated by the numeral 5. At its forward end the body is provided with an occupant's compartment 6, the engine or power plant being located to the rear as indicated at 7. The landing gear illustrated incorporates a pair of forward wheels 8—8 and a rear wheel 9, which is arranged to be retracted into the fuselage as indicated by the dot and dash showing of the wheel outline at 9a. The wheel 9 is mounted to swivel in a journal 9b which is carried by a pivot support 9c, the latter providing for the retracting movement. A shock strut 9d is also associated with the wheel and the upper end of this strut is advantageously coupled with a link 9e which may be employed to effect retraction and extension of the wheel. The details of this mechanism need not be considered herein since they form no part of the present invention per se, but it is mentioned that the arrangement, providing for retraction of the wheel in the position indicated at 9a, is of particular advantage in the general arrangement of aircraft illustrated. One advantageous feature of this arrangement is that the wheel is retracted into a portion of the fuselage which is not of especial effectiveness for the stowage of cargo or for the provision of occupants' space. Moreover, the extension of the shock strut and the retraction mechanism upwardly into the upwardly extended rear portion of the fuselage 5a described more fully hereinafter also avoids encroachment of the landing gear mechanism on other space in the aircraft which can more effectively be employed for other purposes.

As above mentioned, the invention is particularly concerned with an aircraft incorporating a pair of rotors arranged in tandem. These rotors are clearly seen in Figures 1 and 2, the blades of the forward rotor being designated by the numeral 10 and the blades of the rear rotor being designated by the numeral 11. The blades of the two rotors are oriented so as to provide for rotation in opposite senses as is indicated by the arrows r and R. As will be seen, the rotors 10 and 11 are mounted respectively toward the forward end and toward the rear end of the fuselage 5.

It will further be seen that the rotor hubs are spaced from each other longitudinally of the aircraft a distance only slightly greater than the radius of one of the rotors; and still further that the rear rotor is mounted at an elevation appreciably above that of the front rotor so that the rotational path of the rear rotor, when viewed in plan, overlaps that of the front rotor to a considerable extent. This arrangement has a number of advantages, including the fact that rotors of appreciable diameter can be employed without excessive longitudinal spacing of their hubs or rotational axes. Moreover, this rotor arrangement (with one rotor mounted at an elevation above the other) is of advantage as compared with an arrangement in which the blades of the two rotors intermesh, since in the event of failure of the drive interconnection between the rotors, the blades of one rotor will not foul the blades of the other.

Beyond the foregoing, especially where the rotor arrangement above described is applied to a helicopter type of aircraft, the disposition of the rear rotor at an elevation appreciably above that of the front rotor minimizes the effect of the slip stream of the front rotor on the action of the rear rotor. This freedom from interference is of particular importance during translational flight, for which purpose it is contemplated that the aircraft be tilted somewhat nose-down in order to secure a forward horizontal thrust component from each rotor.

With further reference to the location and mounting of the two rotors, it is here noted that the front rotor is preferably mounted considerably in advance of the center of gravity of the aircraft as a whole as indicated at cg, the rear rotor being mounted considerably to the rear of the cg and the engine 7 being mounted intermediate the two rotor axes. Portions of the hub and mounting structure for the rear rotor are advantageously enclosed within a casing or the like indicated at 5a, which constitutes in effect, an upwardly bent tail end portion of the fuselage 5.

Figure 3:
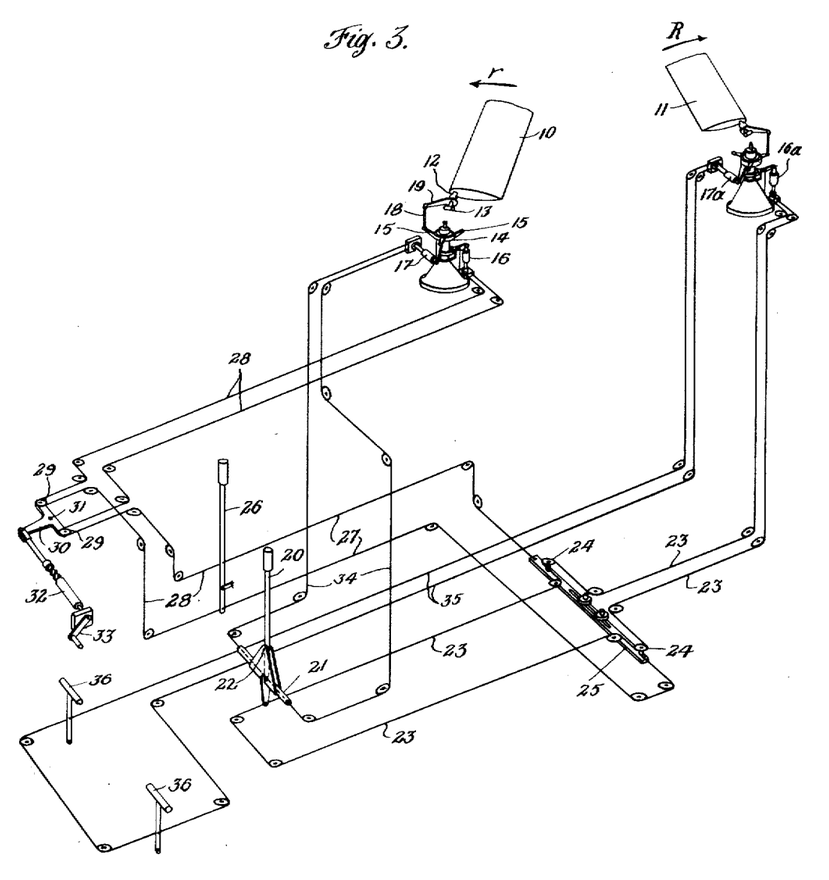
Figure 3 is a somewhat diagrammatic or schematic view of a control system particularly adapted to rotor arrangement illustrated in Figures 1 and 2.

Although various of the fundamental features and advantages of the invention are attainable with rotors of a variety of types, most advantageously each rotor comprises a plurality of blades which are individually articulated to a common hub. As shown in the drawings, the hubs for the two rotors are substantial duplicates, in view of which brief reference is made to only one of them. Referring to Figures 1, 2 and 3, each blade 10 of the forward rotor is connected with a rotative hub by means of a pitch change pivot or journal 12 and by means of a flapping pivot 13, these parts being somewhat diagrammatically illustrated, particularly in Figure 3, in which latter figure certain portions of the hub itself have been removed in order to avoid confusion in the illustration of certain controls described below. The journal 12 provides for movement of the blade 10 about its own longitudinal axis in order to vary the blade pitch. The flapping pivot 13 permits freedom for the blade to swing in a direction transverse its rotative path of travel for compensation of differential lift effects in translational flight, and for other purposes now well understood in this art. In addition, if desired, other blade pivots may be incorporated, including, for example, a lag-lead or drag pivot.

For the purpose of controlling the blade pitch a swash plate 14 is provided which may, in general, be of any known type, preferably incorporating a rotative ring having control arms 15 projecting therefrom, one for each blade, and a nonrotative part which is movable vertically and also is capable of being tilted, whereby the several blades of the rotor are capable of pitch adjustment either concurrently in the same sense or differentially. In the arrangement illustrated the swash members are adapted to be moved vertically by means of a screw jack device 16, adjustment of this device providing for change of the pitch of the blades concurrently in the same sense. Moreover, a screw jack device 17 serves to tilt the swash member laterally of the aircraft, which tilting, in the arrangement illustrated, provides for differential or cyclical pitch variation of the blades of the rotor. The pitch change motions are transmitted from the rotative swash ring 14 and the control arms 15 through vertical links 18 and arms 19 to the blades themselves.

The blade mounting and control parts referred to just above need not be considered in detail herein, since they are, in themselves, of known type, as shown for example in my copending application, Serial No. 605,577, filed July 17, 1945, now Patent No. 2,580,514. It is further here mentioned that the simultaneous or mean pitch control jack for the rear rotor is indicated at 16a and the jack for imposing cyclical pitch variation on the blades of the rear rotor is indicated at 17a.

In accordance with the present invention, it is contemplated that cylical pitch variation of the blades of each rotor shall be employed only in one sense or plane, instead of universally, as in certain prior arrangements, thereby simplifying various parts of the control system including the swash plate mounting, etc. As is known, in a rotor in which the blades are flappingly pivoted, cyclical pitch variation may be employed to effect a shift in the angular position of the line of lift or thrust of the rotor, to thereby introduce controlling moments, either laterally or longitudinally of the aircraft. In the flapping bladed rotor an increase of blade pitch toward one side and a corresponding decrease of pitch at the diametrically opposite point in the circle of rotation sets up a shift of the lift line and a resultant control moment in a vertical plane substantially at right angles to the diametral line on which the points of maximum pitch increase and maximum pitch decrease occur. According to the control system of the present invention, it is contemplated that the blade tip paths and lift lines of the two rotors shall both be angularly variable transversely of the aircraft, and in view of this, the pitch control mechanism is so arranged as to provide for cyclical pitch variation of each rotor in a sense such that the points of maximum pitch increase and maximum pitch decrease occur substantially in the longitudinal vertical plane of the craft. The lateral tilting of the blade tip paths of the rotors effected in this way results in lateral tilting of the lift lines of the rotors. Lateral tilting of the blade tip path may also be achieved by mounting the rotor hub as a whole on a tilting fulcrum of the type shown, for example, in Cierva Patent No. 2,380,580, issued July 31, 1945, and while features of the invention can be attained with either of the described methods for laterally tilting the blade tip path and rotor lift line, in the preferred form of the invention, as herein illustrated, cyclical pitch variation is employed for this purpose.

The control system illustrated in Figure 3 incorporates, as a primary flight control organ a control stick 20 which, according to conventional practice, is mounted for fore and aft and transverse movement, fore and aft movement taking place about the axis of the support 21 and lateral movement about the pivot 22. According to the preferred control system of the invention, this control stick 20 is coupled up with the pitch control mechanisms of the two rotors in such a way as to provide the conventional or instinctive control responses, i. e., nose-down when the control stick is moved forward, nose-up when the control stick is moved to the rear, and banking or turning to the left or to the right when the control stick is moved to the left or to the right. (As viewed in Figure 3, the front and forward direction is toward the left.)

Fore and aft movement of the control stick 20 actuates the cable system 23 which passes over various guide pulleys to the mean pitch control jack 16a of the rear rotor. At an intermediate point in the cable system 23, this cable passes over pulleys 24—24 which are mounted on a transversely slidable bar or support 25. This bar 25 is so arranged that upon transverse movement thereover, one side of the cable system 23 is lengthened and the other shortened, in view of which the cable system 23 can be adjusted not only by fore and aft movement of the control stick 20 but also by transverse movement of the bar 25 for a purpose to be mentioned herebelow.

In addition to the primary control organ 20, another control element 26 is provided, constituting the simultaneous or mean pitch control employed for ascending or descending. Upon fore or aft movement of the control element 26 the pitch of both rotors is either increased or decreased in the same sense, thereby causing the machine to rise or to descend. For this purpose the control element 26 is coupled with the slidable bar 25 by means of a cable system 27. Another cable system 28 is connected with the control element 26 and is extended therefrom over guide pulleys and the like to the mean pitch control jack 16 of the front rotor. At an intermediate point, the two runs of the cable system 28 pass over the pulleys 29—29 which are carried on oppositely extended arms of a double bellcrank 30 which is pivoted at 31 and movable by means of a screw jack device 32 which may be actuated by hand crank 33. The effect of adjustment of the hand crank 33 is to alter the relative mean pitch setting of the forward rotor with relation to that of the rear rotor.

Returning again to the control stick 20, it is noted that lateral movement thereof is employed to effect adjustment of the cable system 34 which is extended to the swash plate tilting jack 17 of the front rotor. The corresponding jack 17a of the rear rotor is coupled by means of a cable system 35 with rudder pedals 36 or other equivalent rudder or steering-type control means.

The operation of the control system above described is as follows:

If it is desired to assume a nose-down attitude (which is contemplated, for example, when it is desired to effect forward translational flight) the control stick 20 is moved forwardly. This causes an adjustment of the mean pitch control jack 16a for the rear rotor in a sense to increase the mean pitch of the rear rotor. The increase of mean pitch of the rear rotor results in an increase in the thrust of the rear rotor in consequence of which the aircraft will assume a nose-down attitude. Both rotors will then have a horizontal thrust component which will effect translational flight. Rearward movement of the control stick causes the machine to assume a nose-up attitude.

Operation of the steering pedals 36 controls the jack 17a of the rear rotor to cause the blade tip path and the lift line of the rear rotor to tilt laterally of the aircraft, the sense of this hook-up preferably being the conventional aircraft sense, i. e., that providing for tilt of the blade tip path downwardly at the left hand side when the right hand steering pedal 36 is pushed forwardly. This downward tilt of the blade tip path on the left hand side introduces a horizontal thrust component laterally to the left and since the rear rotor is located appreciably to the rear of the center of gravity of the aircraft, this will cause the aircraft to turn toward the right. The opposite effect is attained by pushing the left steering pedal 36 forwardly.

In making most turns as above described, the control stick 20 should also be moved to the right or to the left in the instinctive sense, i. e., moved to the right when the right hand steering pedal 36 is actuated and to the left when the left hand steering pedal 36 is actuated. The effect of this lateral movement of the control stick 20 is to adjust the cyclical pitch control jack 17 of the front rotor in a sense to cause the blade tip path and lift line of the front rotor to tilt laterally in the sense opposite to the accompanying tilt of the blade tip path and lift line of the rear rotor. When actuating the steering controls as just described, if the aircraft is in hovering flight (without translational movement), the lateral movement of the control stick and of the lift lines of the two rotors will cause the aircraft as a whole to turn about a vertical axis passing, in general, through the center of gravity of the aircraft. During translational flight, the operation of the steering controls as described above will result in both turning and banking to the left or to the right, this effect being enhanced in translational flight by so disposing the vertical area of the fuselage that the centrum thereof is located somewhat to the rear of the center of gravity, as is indicated at ca in Figure 2. This relationship between the cg and the ca also contributes some weather cock stability in yaw.

It may be mentioned that with the arrangement illustrated, in order to turn the aircraft, during hovering, substantially about a vertical axis (without moments tending to move the aircraft toward one side or the other), it is necessary to actuate both the steering pedals and the control stick. On the other hand, during translational flight turns may be made merely by laterally moving the control stick, since the resulting lateral tilt of the lift line of the forward rotor will set up a horizonal thrust component from the front rotor (due to the lateral tilt of the lift line of the front rotor) which will not only tend to turn the aircraft but which also will tend to bank the aircraft in the proper sense.

The mean pitch control 26 is employed whenever it is desired to ascend or descend more or less vertically, the effect being to increase or decrease the mean pitch of both rotors concurrently and in the same sense. It is further contemplated that the pitch control lever 26 may be employed in the event of engine failure for the purpose of reducing the average pitch of the rotors to a value within the autorotational range, so that the rotors will continue turning aerodynamically and thus effect a safe descent.

The control crank 33 is provided in order to relatively adjust the mean pitch settings of the two rotors, this being of advantage for "trimming" purposes, i. e., to compensate for longitudinal shift in the center of gravity of the aircraft as a whole as a result of different conditions of loading.

From the above it will be seen that control of the aircraft about all axes is provided for and further that this is accomplished without the necessity for making provision for tilting of the blade tip path of either rotor in the longitudinal vertical mid plane of the aircraft, the only tilting provided being in a sense laterally of the aircraft. Because of the foregoing the vertical clearance between the partially overlapped disc areas of the rotors need not be excessive, notwithstanding the fact that the rotor blades are flappingly pivoted. Examination of Figure 2 will at once show that the control arrangement (employing only lateral tilt of the rotor lift lines) permits employment of a smaller vertical clearance between the rotors than would be practicable where either or both of the rotors were arranged so that the blade tip path thereof was tiltable in the longitudinal vertical plane. In Figure 2 an appropriate range of freedom for flapping movement of the blades of the forward rotor is indicated by the dot and dash lines 10a and 10b. Similarly, the range of flapping movement of the blades 11 of the rear rotor is indicated at 11a and 11b. Attention is called to the fact that the upper limit of flapping movement of the blades of the front rotor (represented by line 10b), and the lower limit of flapping of the blades of the rear rotor (represented by the line 11a) are so disposed that the rear edge of the blade tip path of the front rotor may even be somewhat higher than the forward edge of the blade tip path of the rear rotor without resulting in interengagement of the rotor blades of the two rotors. The particular form of controls above described, therefore, is of especial advantage in the rotor arrangement illustrated wherein the rear rotor is mounted to overlap the front rotor and in which the rotor blades are flappingly pivoted.

As hereinbefore mentioned, the arrangement of the invention is especially adapted to that type of rotative winged aircraft in which the rotors are hub driven at least during normal flight operation. For this purpose the engine 7 is connected with the two rotors through drive shafting and transmission mechanism including the following elements. The power shaft 37 of the engine is connected by gearing housed at 38 with a clutch mechanism 39. Preferably this clutch mechanism includes both an overrunning clutch and a manually controllable clutch, the former of which will ensure free rotation of the rotor in the event of power failure. The power output shaft from the clutch mechanism is connected by gearing housed at 40 with the forwardly extending rotor drive shaft 41 and the rearwardly extending drive shaft 42. Shaft 41 is geared to the rotor drive spindle of the front rotor as at 43 and gearing housed at 44 serves to connect the shaft 42 with an upright shaft 45 which extends upwardly within the upturned tail 5a for connection with the drive spindle of the rear rotor.

The rotor drive connections are arranged to provide for rotation of the two rotors in opposite senses so that the torque effect of the front rotor on the body is approximately neutralized by the torque effect of the rear rotor on the body. It will be understood, of course, that other forms of rotor drive mechanism may be employed including not only other forms of drive through the rotor hubs, but also various forms of "torqueless" drive, in which latter event rotation of the rotors in opposite senses is not a necessary requirement. The important features of the arrangement of the two rotors and of the control system provided therefor are equally applicable to aircraft embodying the above described as well as other forms of rotor drive, and may even be employed in an aircraft of the type in which the rotors are normally autorotationally actuated.

Figure 4:
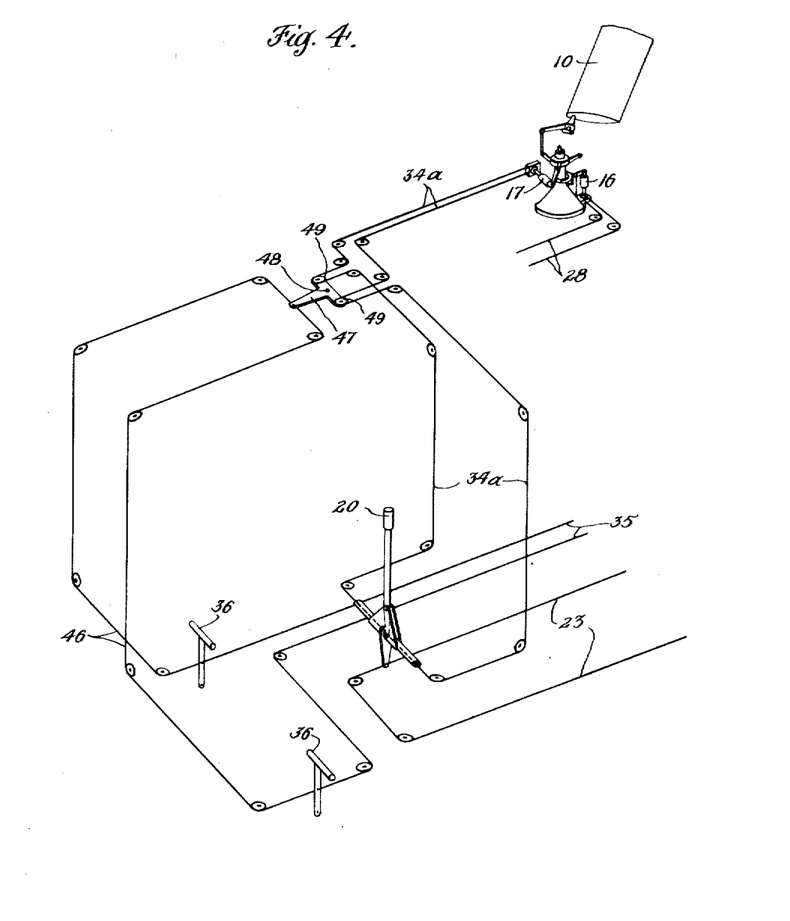
Figure 4 is a view similar to Figure 3 but illustrating a modified control system.

The modified control system illustrated in Figure 4 is also adaptable to tandem-rotor aircraft of a wide variety of types. The arrangement of Figure 4 is in general similar to that illustrated in Figure 3, and various portions of the mechanism shown in Figure 4 have therefore been identified by the same reference characters as in Figure 3.

In Figure 4 certain parts of the control system have been omitted from the illustration, so as to avoid confustion. Thus the rear rotor is not shown in Figure 4, nor is the mean pitch control lever 26 and the associated connections which extend to the front rotor as well as to the transversely slidable bar 25 which is provided for adjustment of the cable system 23. It is contemplated, however, that all of these parts be employed in association with the elements shown in Figure 4.

The primary difference between the arrangement of Figure 4 and the arrangement of Figure 3 is as follows:

In Figure 4, in addition to the cable system 35, a second cable system 46 is associated with the steering pedals 36 and is extended therefrom to one arm of a double bellcrank 47 which is pivoted at 40. The other two arms of this bellcrank carry pulleys 48—49 which are associated with the cable system 34a which is extended from the control stick 20 to the screw jack device 17 for tilting the blade tip path of the forward rotor laterally. As with cable system 34 of Figure 3, the cable system 34a of Figure 4 is connected with the control stick 20 so as to be actuated thereby when the control stick is moved laterally, i. e., in a transverse plane. By means of this hook-up actuation of the steering pedals 36 not only tilts the blade tip path of the rear rotor laterally, but in addition tilts the blade tip path of the forward rotor laterally, the tilt for the two rotors being in opposite senses. In this way an effective control system is provided for turning the aircraft about the vertical axis, for instance in hovering flight, merely by actuation of one or the other of steering pedals 36. Moreover, in translational flight actuation of the steering pedals will not only produce the steering effect of tilting the blade tip path of the rear rotor, but in addition will result in a banking moment, for reasons brought out above in the description of the operation of Figure 3, including the relation between the center of gravity and the centrum of the vertical fin area of the aircraft. With the arrangement of Figure 4 additional banking may be secured by lateral tilting of the control stick 20, the two effects being superimposed upon each other because of the association of the cable system 34a with the bellcrank 47.

I claim:

1. An aircraft comprising a body, a bladed sustaining rotor mounted toward the front of the aircraft, a bladed sustaining rotor mounted toward the rear of the aircraft, and a control system incorporating flight control means for controlling the longitudinal attitude of the aircraft comprising mechanism for relatively varying the mean blade pitch of the two rotors, means for controlling ascent and descent of the aircraft comprising mechanism for concurrently raising and lowering the mean pitch of both rotors, and means for trimming the longitudinal attitude of the aircraft comprising a second mechanism for relatively varying the mean blade pitch of the two rotors.

2. An aircraft according to claim 1 in which the control system further includes a flight control organ for use in steering the aircraft comprising mechanism for tilting the blade tip path of one of the rotors independently of the position of the blade tip path of the other rotor.

3. An aircraft comprising a body and a pair of sustaining rotors each incorporating blade means mounted for flapping movement, the two rotors being arranged in tandem, with one rotor mounted at an elevation above that of the other, and with the horizontal spacing of the rotors such that, when viewed in plan, the paths swept by the blades of the two rotors overlap, the vertical spacing of said rotors being such that a portion of the blade tip path of the lower rotor at high angles of flapping is above the lowest blade tip path of the upper rotor at low angles of flapping and the horizontal spacing of the centers of the rotors being such that the blades of the two rotors clear each other in the region of overlapping at any angle of flapping of either rotor.

4. In an aircraft having a body, a pair of variable pitch bladed sustaining rotors having their axes offset from each other longitudinally of the aircraft, a control system incorporating flight control means for controlling ascent and descent of the aircraft comprising mechanism for concurently raising and lowering the mean pitch of both rotors, and two separately operable control means comprising mechanisms for respectively and independently varying the mean blade pitch of the two rotors.

5. A construction in accordance with claim 4 in which one of said two last control means comprises a flight control organ movable in a fore and aft direction, and in which the other of said two last control means comprises a longitudinal attitude trimming adjustment device.

6. A construction in accordance with claim 4 and further including mechanism for cyclically varying the blade pitch of one of the rotors to provide for controllable lateral tilting of the blade tip path of that rotor.

7. A construction in accordance with claim 6 in which said mechanism for cyclically varying the rotor blade pitch angle of one of the rotors comprises a foot operated control organ.

8. In an aircraft having a body, a pair of variable pitch bladed sustaining rotors having their axes offset from each other longitudinally of the aircraft, a control system comprising a primary flight control organ movable in fore and aft and transverse directions, a foot operated control organ, and a third control organ operable independently of the first two, together with control connections associated with the control organs and providing for rotor blade pitch variation, in which construction the said control connections provide for mean blade pitch variation of the rear rotor upon fore and aft movement of the primary control organ, cyclic pitch variation of the front rotor upon transverse movement of said primary control organ in a sense such as to variably tilt the blade tip path of the front rotor laterally of the aircraft, cyclic pitch variation of the rear rotor upon operation of the foot operated control organ in a sense such as to variably tilt the blade tip path of the rear rotor laterally of the aircraft, and concurrent and similar mean blade pitch change of both rotors upon actuation of said third control organ.

9. A construction in accordance with claim 8 and further including an adjustable device for trimming the longitudinal attitude of the aircraft comprising mechanism for relatively varying the mean blade pitch of the two rotors.

10. A construction in accordance with claim 9 in which the trimming adjustment device is operative to vary the mean blade pitch of the front rotor independently of the rear rotor.

11. An aircraft comprising a body, a sustaining rotor mounted on the body well forward of the center of gravity of the aircraft and having at least one blade mounted for angular oscillation in a direction transverse the rotational path, a second sustaining rotor mounted on the body well to the rear of the center of gravity of the aircraft and having at least one blade mounted for angular oscillation in a direction transverse the rotational path, mechanism for laterally tilting the blade tip path of the forward rotor, mechanism for laterally tilting the blade tip path of the rear rotor, a flight control system for said aircraft providing for control of at least one of said mechanisms independently of the other and comprising two separately operable pilot-control elements, the first of said control elements constituting the roll control organ for the aircraft and the second of said control elements constituting the yaw control organ for the aircraft, coupling means connecting the roll control element with the mechanism for laterally tilting the blade tip path of the front rotor, and coupling means connecting the yaw control element with the mechanism for laterally tilting the blade tip path of the rear rotor, at least one of said mechanisms for laterally tilting the blade tip paths of the rotors being connected to and actuable by one only of said two control elements to thereby provide for tilting of the blade tip path of one rotor with respect to the aircraft independently of the angle of tilt of the other rotor with respect to the aircraft.

12. A construction in accordance with claim 11 and further including coupling means connecting the yaw control element with the mechanism for tilting the blade tip path of the forward rotor providing for laterally tilting the blade tip paths of the rotors in opposite senses, the two coupling means connected with the mechanism for tilting the blade tip path of the forward rotor being constructed to superimpose the control effects set up by operation of said control elements.

13. A construction in accordance with claim 11 in which the rear rotor further has mechanism providing for variation of the mean blade pitch thereof and in which the roll control element is movable in two senses, the coupling means connecting the roll control element with the mechanism for laterally tilting the blade tip path of the forward rotor being actuable by movement of the roll control element in one sense, the control system further including coupling means connecting the roll control element with the mechanism for varying the mean blade pitch of the rear rotor, this last coupling means being actuable by movement of the roll control element in the other sense.

14. An aircraft comprising a body, a sustaining rotor mounted on the body well forward of the center of gravity of the aircraft and having at least one blade mounted for angular oscillation in a direction transverse the rotational path, a second sustaining rotor mounted on the body well to the rear of the center of gravity of the aircraft and having at least one blade mounted for angular oscillation in a direction transverse the rotational path, mechanism for laterally tilting the blade tip path of the forward rotor, mechanism for laterally tilting the blade tip path of the rear rotor, a flight control system for said aircraft providing for control of at least one of said mechanisms independently of the other and comprising two separately operable pilot-control elements, the first of said control elements being movable in a transverse plane and constituting the roll control organ for the aircraft and the second of said control elements being a foot-operable member and constituting the yaw control organ for the aircraft, coupling means connecting the roll control element with the mechanism for laterally tilting the blade tip path of the front rotor and actuable by movement of the first control element in said transverse plane, and coupling means connecting the yaw control element and the mechanism for laterally tilting the blade tip path of the rear rotor, at least one of said mechanisms for laterally tilting the blade tip paths of the rotors being connected to and actuable by one only of said two control elements to thereby provide for tilting of the blade tip path of one rotor with respect to the aircraft independently of the angle of tilt of the blade tip path of the other rotor with respect to the aircraft.

15. An aircraft comprising a body of which the centrum of the vertical surface area is located to the rear of the center of gravity, a pair of bladed sustaining rotors arranged in tandem, one forward and the other to the rear of the center of gravity, mechanism for laterally tilting the blade tip path of the forward rotor, mechanism for laterally tilting the blade tip path of the rear rotor, a flight control system for said aircraft providing for control of at least one of said mechanisms independently of the other and comprising two separately operable pilot-control elements, the first of said control elements constituting the roll control organ for the aircraft and the second of said control elements constituting the yaw control organ for the aircraft, coupling means connecting the roll control element with the mechanism for laterally tilting the blade tip path of the front rotor, and coupling means connecting the yaw control element with the mechanism for laterally tilting the blade tip path of the rear rotor, at least one of said mechanisms for laterally tilting the blade tip paths of the rotors being connected to and actuable by one only of said two control elements to thereby provide for tilting of the blade tip path of one rotor with respect to the aircraft independently of the angle of tilt of the other rotor with respect to the aircraft.

HARRIS S. CAMPBELL.

References Cited in the file of this patent

UNITED STATES PATENTS

| Number | Name | Date |
|---|---|---|
| D. 140,480 | Maycen | Feb. 27, 1945 |
| D. 144,401 | Lewis | Apr. 9, 1946 |
| 1,350,982 | Beurrier | Aug. 24, 1920 |
| 1,783,011 | Florine | Nov. 25, 1930 |
| 1,884,596 | Cierva | Oct. 25, 1932 |
| 2,078,823 | Weaver | Apr. 27, 1937 |
| 2,273,303 | Waldron | Feb. 17, 1942 |
| 2,338,935 | Hafner | Jan. 11, 1944 |

FOREIGN PATENTS

| Number | Country | Date |
|---|---|---|
| 155,974 | Switzerland | Oct. 1, 1932 |
| 335,389 | Italy | Feb. 5, 1936 |

Disclaimer 2,659,551.—*Harris S. Campbell*, Bryn Athyn, Pa. CONTROL SYSTEM FOR TANDEM ROTOR HELICOPTERS. Patent dated Nov. 17, 1953. Disclaimer filed June 25, 1964, by the assignee, *Autogiro Company of America*.

Hereby enters this disclaimer to claims 1, 4, 5, 6, 7, 8, and 9 of said patent.
[*Official Gazette September 15, 1964*]